United States Patent [19]

De Paepe et al.

[11] Patent Number: 4,709,583
[45] Date of Patent: Dec. 1, 1987

[54] ELECTROMAGNETIC FLOW METER USING A PULSED MAGNETIC FIELD

[75] Inventors: Thijlbert De Paepe, Palaiseau; Gérard Crochet, Cernay La Ville, both of France

[73] Assignee: Sereg, Montrouge, France

[21] Appl. No.: 923,991

[22] Filed: Oct. 28, 1986

[30] Foreign Application Priority Data

Oct. 31, 1985 [FR] France ................................ 85 16192

[51] Int. Cl.$^4$ ............................................... G01F 1/60
[52] U.S. Cl. .................................................. 73/861.17
[58] Field of Search ............ 73/861.17, 861.16, 861.12

[56] References Cited

U.S. PATENT DOCUMENTS 4,210,022  7/1980  Boss .................................... 73/861.17
4,422,337 12/1983  Hafner ............................... 73/861.17
4,658,653  4/1987  Tomita ............................... 73/861.17

Primary Examiner—Charles A. Ruehl
Attorney, Agent, or Firm—Dale Gaudier

[57] ABSTRACT

A flow meter comprises electrodes (16, 18), induction windings (12, 14), a winding driver circuit (20), and a processor circuit (22). The winding excitation current is a combination of a current of period $T_1$ and a current of period $T_2$, where $T_2 > T_1$. The processor circuit (22) processes the voltage signal sent by the electrodes and generates intermediate measurement signals of periods $T_1$ and $T_2$. These signals are then used to generate a correction signal for removing the relaxation effect from the measurement signal S.

9 Claims, 9 Drawing Figures

ELECTROMAGNETIC FLOW METER USING A PULSED MAGNETIC FIELD

The present invention relates to an electromagnetic flow meter, and more particularly to a circuit for generating the magnetic field and for processing the voltage sensed by the flow meter electrodes.

BACKGROUND OF THE INVENTION

In an electromagnetic flow meter of the type described in French Pat. No. 2 405 466, the liquid whose flow rate is to be measured flows along a portion of duct which is fitted with induction windings to set up a magnetic field perpendicularly to a portion of duct, and a pair of diametrically opposed electrodes for sensing the voltage which results from the liquid flowing through the magnetic field. This voltage is proportional to the average speed of the liquid and thus to its average flow rate. The voltage can be processed to obtain an electric signal representative of the liquid flow rate.

The magnetic field may be set up either by means of a sinewave current or else by means of a pulsed direct current.

When using a sinewave current, the frequency of the signal is generally about 30 Hz to about 50 Hz. The signal sensed on the electrodes comprises: a flow rate signal which is in phase with the modulation of the electric current, a parasitic induction signal which is in quadrature with the modulation of the current; and a second parasitic signal whose phase and amplitude vary as a function of the nature of the fluid and the surface state of the electrodes.

Such a system suffers from drift even when the flow rate is zero. This drift may be as much as several percent depending on the type of fluid and on the electrodes. The zero point adjustment must be performed on the final installation by the user. However, with this type of drive to the magnetic field, it is easy to filter out very low frequency noise ($<10$ Hz) created by particle-laden resistive liquids and by liquids having marked acid or basic properties. Given the frequency of the base signal (30 Hz to 50 Hz), effective filtering can be performed with a short time constant, for example less than three seconds. Such a time constant is compatible with the flow meter being used as a link in a regulation servo system, for example.

When controlled by a pulsed current, the modulation frequency is generally chosen to lie in the range 1 Hz to 10 Hz. Accompanying FIGS. 1a and 1b show the operation of prior art flow meters using pulsed current control.

FIG. 1a shows the intensity I of the control current (or field strength B of the resulting magnetic field) as a function of time t. FIG. 1b shows the corresponding voltage signal (V) sensed on the electrodes of the flow meter as a function of time, for a given flow rate of a given liquid.

Each pulse in the voltage signal comprises: a first zone A corresponding to a parasitic induction effect which occurs when the direction of the magnetic field is reversed; followed by a zone B corresponding to a relaxation effect produced in the fluid-electrode interface at the moment the magnetic field is reversed. As shown by the curve in FIG. 1b, this parasitic effect wears off slowly to leave a pure flow rate signal which corresponds to a zone C. In order to obtain a signal representative of the flow rate, the signal must be observed in zone C of pulse. The flow rate signal is then proportional to $U_1 - U_2$. This system has a highly stable zero point, and in addition, any drift from zero is self-compensating since the measurement signal comes from the difference of two voltages, thereby eliminating a parasitic DC voltage referred to as the asymmetry voltage. FIG. 1b does not show the asymmetry voltage. The above-mentioned French patent describes in detail how the asymmetry voltage may be eliminated. In contrast, this feed system makes it difficult to properly eliminate low frequency noise of the type present in non-homogenous sludge. Given the frequency of the signal to be filtered (1 Hz to 10 Hz), the time constant of the filter circuit may be as much as several tens of seconds. This makes it very difficult, if not impossible, to use such a flow meter in a regulation control loop, since obtaining a noise-free measurement signal gives rise to a response time which is too long.

Preferred embodiments of the present invention provide an electromagnetic flow meter which combines the advantages of the two prior art principles in order to measure flow rates without zero drift and with low noise combined with a rapid response time. Such a flow meter is thus easier to use in a regulation chain, for example.

SUMMARY OF THE INVENTION

The present invention provides an electromagnetic flow meter comprising:

a measuring tube for passing the liquid whose flow rate is to be measured;

induction windings having an excitation current passing therethrough for setting up a magnetic field perpendicular to the direction of liquid flow;

diametrically-opposed electrodes for sensing the voltage signal which results from the flow of liquid through the magnetic field;

a circuit for feeding current to said induction windings and comprising means for generating a periodic excitation current of period T, each period T being the result of a combination in time of n periods of a first excitation current ($I_1$) of period $T_1$ and m periods of a second excitation current ($I_2$) of period $T_2$, where $T_2 > T_1$, with the period $T_2$ being long enough to ensure that portion of the corresponding sensed voltage signal is free from the relaxation phenomenon; and a processor circuit comprising means for generating a first intermediate measurement signal ($M_1$) of period $T_1$ and having a short response time, a second intermediate measurement signal ($M_2$) corresponding to the voltage signal of period $T_2$ and being free from measurement drift, and for combining and filtering said first and second intermediate measruement signals in order to generate a measurement signal S being both short in response time and free from drift.

It can thus be seen that the first intermediate signal $M_1$ has sufficient pulses per period T for effecting filtering to be performed in a limited number of periods T, and that each pulse of the voltage signal of period $T_2$ is sufficiently long to include a portion which is free from relaxation phenomena.

In a first embodiment of the first and second excitation currents are currents in which the periods are constituted by alternating positive-going and negative-going pulses, each of duration $T_1/2$ or $T_2/2$ as the case may be, and said combination consists in alternating n periods of the first current with m periods of the second current so as to obtain the relationship:

$$T = nT_1 + mT_2$$

In a second embodiment, the first excitation current is a sinewave current and each period of said second excitation current consists in a positive-going half cycle and a negative-going half cycle of duration $t' = T_2/2$, said combination consisting in superposing said first and second currents to obtain the relationship:

$$T = nT_2$$

Preferably the period $T_1$ lies in the range 5 milliseconds to 100 milliseconds, m is equal to 1, and the period $T_2$ lies in the range 50 milliseconds to 1 second.

In a preferred embodiment, said processor circuit comprises means for generating a corrections signal based on said intermediate measurement signals $M_1$ and $M_2$, said correction signal being substantially free from noise, together with means for generating said measurement signal S from said first intermediate measurement signal $M_1$ and said correction signal, said measurement signal being substantially free from drift.

BRIEF DESCRIPTION OF THE DRAWINGS

Embodiments of the invention are described by way of example with reference to the accompanying drawings, in which.

DETAILED DESCRIPTION OF THE PREFERRED EMBODIMENTS

A first embodiment of an electromagnetic flow meter in accordance with the invention is described with reference to FIGS. 2 and 3.

Figure 2:
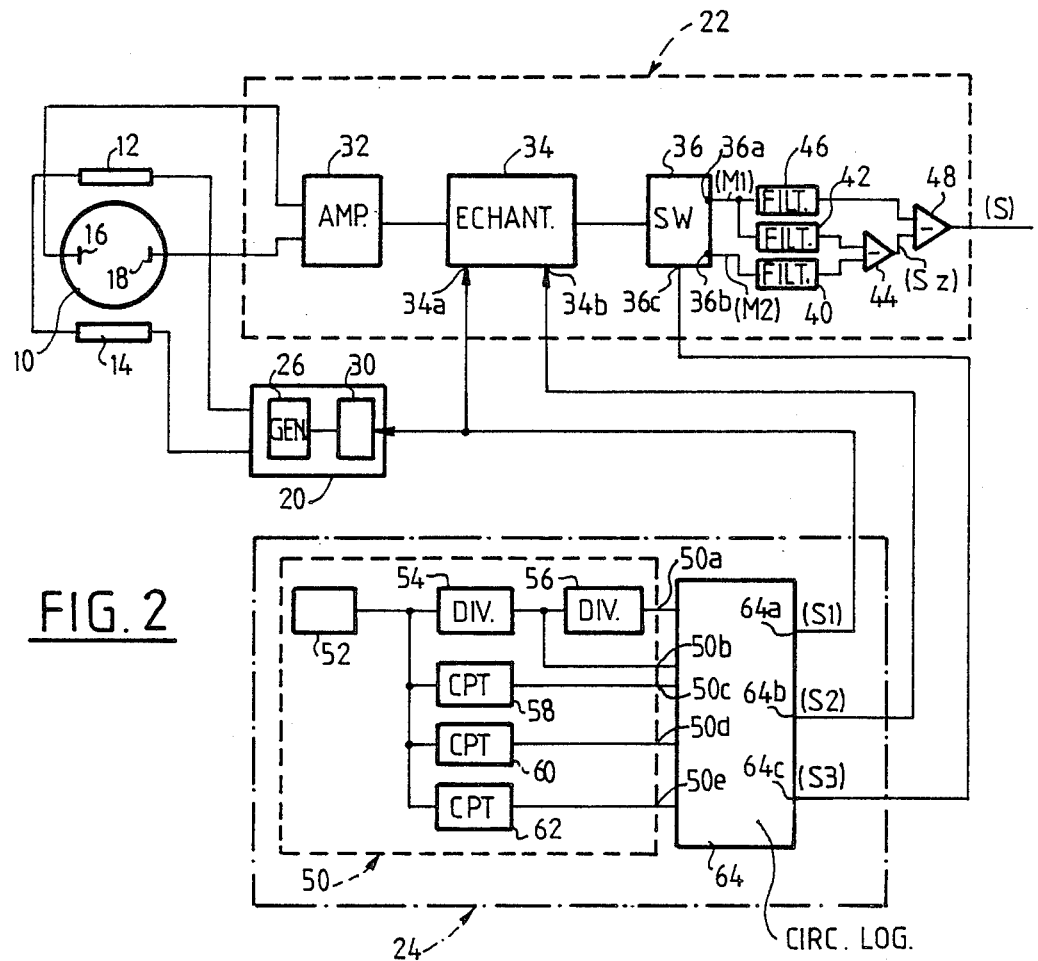
FIG. 2 is a block diagram of the first embodiment of a circuit in accordance with the invention for processing the voltage signal sensed by the flow meter electrodes.

As can be seen in FIG. 2, the flow meter comprises a cylindrical measuring tube 10 through which there flows the liquid whose flow rate is to be measured. The tube 10 has two induction windings 12 and 14 disposed diametrically opposite each other in order to produce a magnetic field perpendicular to the direction of liquid flow, i.e. perpendicular to the axis XX' of the tube 10. The tube also includes two diametrically opposed electrodes 16 and 18 which are in contact with the liquid flowing along the tube. The electrodes 16 and 18 serve to sense the electromotive force (emf) created by the flow of liquid through the magnetic field produced by the induction windings 12 and 14.

The flow meter also includes an electronic circuit constituted by a circuit 20 for feeding the induction windings 12 and 14, a circuit 22 for processing the voltage signal sensed by the electrodes 16 and 18, and a sequencer circuit 24 for controlling the circuits 20 and 22.

In this first embodiment of a flow meter, the winding feed circuit 20 is constituted by a voltage controlled constant current generator 26 capable of producing a constant positive or negative current, and a generator control circuit 30 for reversing the direction of current flow through the induction windings 12 and 14.

The processor circuit 22 comprises a preamplifier 32 whose inputs are connected to the electrodes 16 and 18, and a sampling and calculation circuit 34 connected to the output from the preamplifier 34.

The output from the sampling circuit 34 is connected to a selection and switching circuit 36 for controlling filters described below.

The selector circuit 36 has two outputs 36a and 36b which are respectively connected to the inputs of two filters respectively referenced 40 and 42 and having time constants $t_3$ and $t_2$ which are as close to each other as possible. These filters are lowpass filters. The outputs from these filters 40 and 42 are connected to the inputs of a subtractor 44. The output 36a from the selector 36 is also connected to the input of a thirdlow pass filter 46 having a time constant $t_1$ where $t_1$ is much less than $t_2$ and $t_3$. The outputs from the subtractor 44 and from the filter 46 are connected to the inputs of a subtractor 48.

Figure 3:
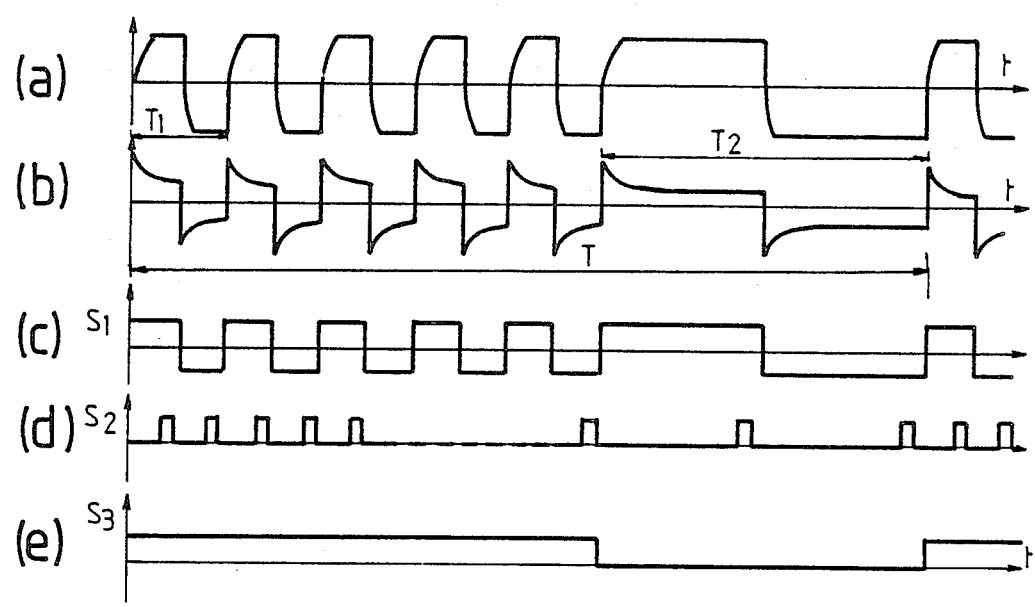
FIG. 3 is a waveform diagram respectively showing the magnetic field provided by the induction windings in accordance with a first implementation of the invention, the corresponding voltage signal sensed at the electrodes, and the control signals used in the FIG. 2 circuit.

Before describing the structure of the sequencer circuit 24, reference is made to the waveform diagrams shown in FIG. 3.

Waveforem 3(a) shows the variation as a function of time in the current applied to the induction windings 12 and 14, and is thus substantially representative of the variations as a function of time in the magnetic fields created by the induction windings.

The excitation current has a period T which is constituted by two alternating series of pulses $I_1$ and $I_2$ which are all of equal amplitude. The first series of pulses $I_1$ is formed, as shown in FIG. 3, by five periods $T_1$ of alternating rectangular pulses. The second series $I_2$ is constituted by a single period $T_2$ of alternating pulses which are likewise rectangular. Thus:

$$T = 5T_1 + T_2$$

More generally, the period T comprises 2n successive half-cycle cycle pulses of period $T_1$ and 2m successive half-cycle pulses of period $T_2$ giving the relationship:

$$T = nT_1 + mT_2$$

where $T_1 < T_2$.

Waveform 3(b) represents the voltage sensed by the electrodes. As already explained, the sensed voltage pulses are affected by a parasitic relaxation effect. This effect may affect the entire duration of the pulses of period $T_1$. In contrast, the period $T_2$ is chosen to be long enough to ensure that the end of each pulse is free from the relaxation phenomenon.

The sequencer circuit 24 serves firstly to control the application of a pulse current having the waveform shown in waveform 3(a) to the induction windings, and secondly to generate control signals for the processor circuit 22.

Waveforem 3(c) is representative of a signal $S_1$ for controlling the current applied to the induction windings. The signal $S_1$ has a period T and is constituted by five pulses of duration $T_1/2$ separated by time intervals of equal duration $T_1/2$, and by a single pulse of duration $T_2/2$ and a single interval of equal duration $T_2/2$. The signal $S_1$ is high when the current is positive and zero when the current is negative. Waveforem 3(d) shows a signal $S_2$ which is used to control the instants at which the voltage signal delivered by the electrodes 16 and 18 is measured. The signal $S_2$ has a period T. Each period comprises a first series of ten half-cycle pulses (2n) separated by time intervals $T_1/2$. Each of the pulses in this portion of the signal $S_2$ is offset relative to the corresponding pulse in the signal $S_1$ by a length of time $b_1=aT_1$ (where $a<1$). Each period of the signal $S_2$ also comprises two pulses (2m) separated by time intervals equal to $T_2/2$. These pulses in the signal $S_2$ are offset relative to the corresponding pulses in the signal $S_1$ by a length of time $b_2=bT_2$ (where b is less than 1).

The values a and b are chosen to that a pulse of the signal $S_2$ is present at the end of each pulse of the voltage signal. The number b is determined more exactly so that the corresponding pulse in the signal $S_2$ is present for that portion of the voltage pulse which is free from the relaxation phenomenon.

Waveform 3(e) is representative of a third control signal $S_3$ of period T which is used to distinguish between that portion of each period T where the pulses of period $T_1$ are present from that portion of the same period T where the pulses of period $T_2$ are present. Each period of the signal $S_3$ comprises a single positive going portion of duration $5T_1$ ($nT_1$) and a negative going portion of duratin $T_2$ ($mT_2$).

The structure of the sequencer circuit 24 is described in greater detail with further reference to FIG. 2.

The circuit 24 includes a generator 50 which has outputs 50a, 50b, 50c, 50d, and 50e permanently delivering signals of period $T_1$, $T_2$, $nT_1$, $mT_2$ and the shifted control signal $S_2$. The generator 50 includes an oscillator 52 which delivers a signal of period T', where T' is much less than $T_1$. The output from the oscillator 52 is connected to the input of two frequency dividers 54 and 56 connected in cascade which deliver signals of period $T_1$ and $T_2$, and to the inputs of three counters 58, 60 and 62 which respectively deliver the signal $S_2$ and the signals of periods $nT_1$ and $mT_2$. The outputs 50a to 50e from the generator 50 are connected to respective inputs of a logic circuit 64 which has three outputs 64a, 64b, and 64c on which it delivers the control signals $S_1$, $S_2$, and $S_3$ respectively. Such a logic circuit is conventional and there is no need to describe it in greater detail.

The signal $S_1$ is applied to the input of the control circuit 30 of the current generator, and to the control input 34a of the circuit 34. The signal $S_2$ is applied to the sampling cntrol input 34b of the circuit 34. Finally, the signal $S_3$ is applied to the control input 36c of the selector 36.

The circuit shown in FIG. 2 operates as follows: the constant current delivered by the generator 26 is applied to the induction winding with alternating polarity and with the polarity-reversal instants being under the control of the signal $S_1$. This current has the waveform shown in waveform 3(a). In a particular implementation, the period $T_1$ is 32 milliseconds (ms) and the period $T_2$ is 131 ms. The overall period T is thus equal to 291 ms.

The voltage sensed by the electrodes 16 and 18 has the waveform shown in waveform 3(b). Each period T comprises five positive and negative half-cycle pulse pairs of period $T_1$ and a single positive and negative half-cycle pulse pair of period $T_2$, and each of these pulses may be degraded by the relaxation effect and by noise. The sensed voltage is amplified by the preamplifier 32. The sampler takes a sample of the signal at the end of each positive or negative pulse at instants which are defined by the signal $S_2$, and the signal $S_1$ is used to cause differences to be taken between sampled values. Since the switch 36 is controlled by the signal $S_3$, the samples taken from the portion of the signal having a period $T_2$ and constituting the second intermediate measurement signal $M_2$ are applied to the input of the filter 40. As explained above, these samples suffer from noise but they are free from the relaxation phenomenon. One such sample is taken per period T, i.e. every 291 ms. Similarly, the samples taken from the signal portion of period $T_1$ and forming the intermediate measurement signal $M_1$ are applied to the inputs of the filters 42 and 46 having time constants $t_2$ and $t_1$. These samples are affected both by noise and by the relaxation effect. There are five samples per period T.

The time constants $t_3$ and $t_2$ are identical and equal to 30 seconds. The common time constant value is sufficiently long to provide good noise filtering even though there is only one sample per period T. The output from the subtractor 44 delivers a correction signal $S_z$ which provides a signal which is representative of the error due to the relaxation effect and which is free from noise.

The signal delivered by the filter 46 which has a considerably smaller time constant $t_1$, for example a time constant of three seconds, is well filtered but suffers from the relaxation effect.

The output from the subtractor 48 thus delivers a measurement signal S which is free both from the relaxation effect and from noise, and which is usable in a regulation system since overall it behaves as though filtering is taking place with the shorter time constant $t_1$ which is equal to 3 seconds.

Figure 2A:
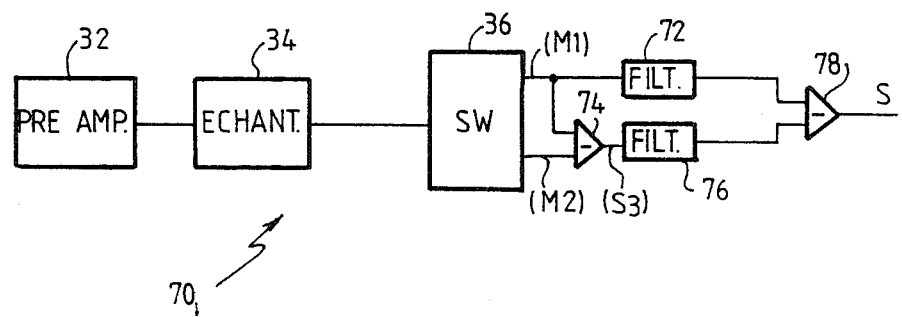
FIG. 2a shows a variant of the FIG. 2 circuit.

FIG. 2a shows a variant embodiment of the processor circuit 22 shown in FIG. 2.

The circuit referenced 70 comprises, like the circuit 22, the preamplifier 32, the calculation and sampling circuit 34 and the selector circuit 36 having two outputs 36a and 36b. The first intermediate measurement signal $M_1$ of period $T_1$ appears on the output 36a which is connected to one of the input terminals of the subtractor circuit 74 and to the input of a lowpass filter 72 which is identical to the filter 46 and which has the same time constant $t_1$. The second intermediate measurement signal $M_2$ of period $T_2$ appears on the output 36b of the selector 36 which is connected to the second input terminal of the subtractor 74. The output from the subtractor 74 delivers a correction signal which is applied to the input of a lowpass filter 76 having a time constant $t_2$ which is identical to that of the filter 40. The outputs from the filters 72 and 76 are connected to the inputs of a subtractor 78 which delivers the measurement signal S with the above-described characteristics.

Figure 1A:
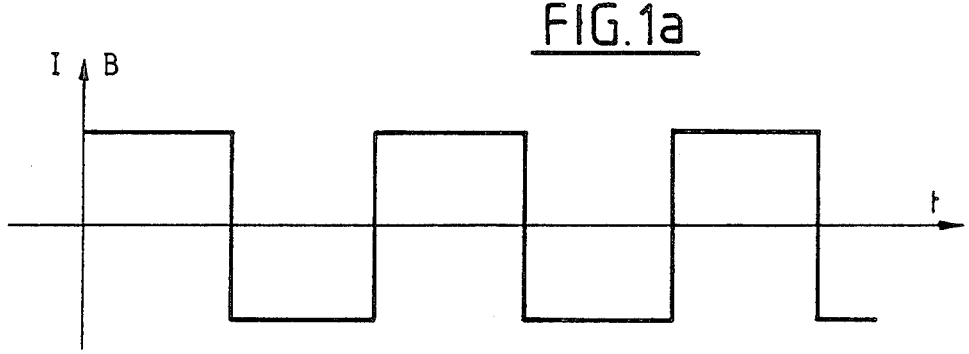
FIGS. 1a and 1b are described above and show a prior art method of processing the signal sensed by the electrodes in an electromagnetic flow meter.
Figure 1B:
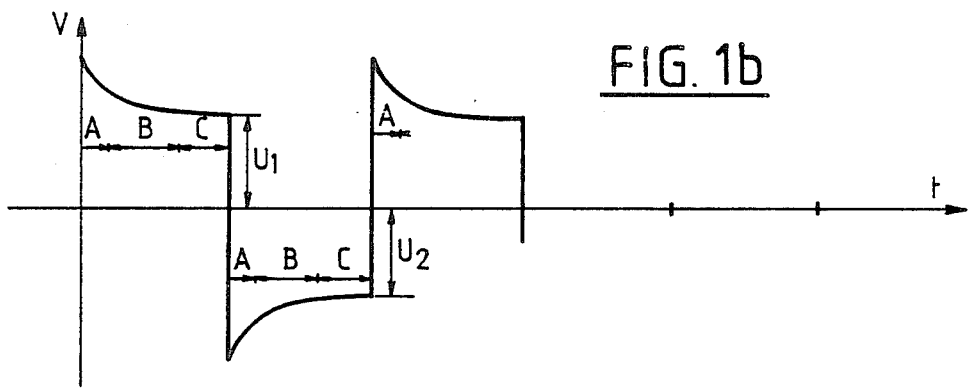
Figure 4:
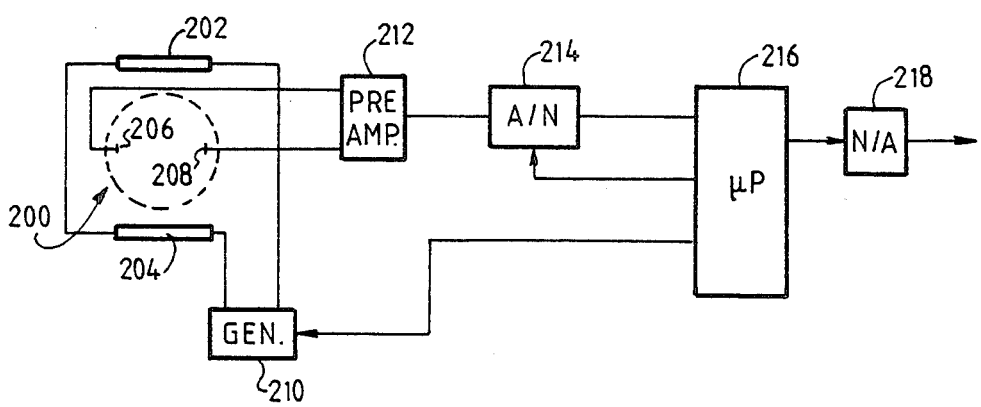
FIG. 4 is a block diagram showing a variant circuit for processing the voltage signal in accordance with a first embodiment of the invention.

FIG. 4 shows a variant of the first embodiment of the electronic circuit associated with the measurement sensor. In this variant, the signal is processed digitally instead of being processed by analog means, as in the FIG. 2 circuit.

The flow meter shown in FIG. 4 comprises a sensor per se constituted by a measuring tube 200 with induction windings 202 and 204, and with electrodes 206 and 208 for sensing the voltage signal.

The electronic circuit is essentially constituted by a current source 210 for feeding the induction windings 202 and 204, an impedance-matching preamplifier 212 which receives the voltage signal present on the electrodes 206 and 208, an analog-to-digital converter 214 which converts the voltage signal into digital form and which also provides the sampling function, and a microprocessor 216 which performs both the sequencing and the signal processing functions. The circuit may also include a digital-to-analog converter 218 for delivering an output signal, for example an electric current, which is proportional to the fluid flow rate as calculated by the microprocessor 216.

The microprocessor 216 is advantageously a Motorola type 6803 microcontroller which generates the signals $S_1$ and $S_2$ shown in FIG. 2 digitally, and which applies them to the current driver 210 and to the analog-to-digital converter 214 respectively. The program for generating the signals $S_1$ and $S_2$ from a clock signal is conventional and does not need describing in greater detail. The microprocessor also performs digital filtering on the portions of the voltage corresponding respectively to the periods $T_1$ and $T_2$, and it combines the filtered portions in the same manner as does the analog circuit shown in FIG. 3. A particular advantage of digital processing is that is makes it possible to define filter parameters to a high degree of accuracy. It is thus possible to obtain time constants $t_2$ and $t_3$ which are very close to each other.

Using a microprocessor for digitally processing, and in particular for filtering, digitized signals is conventional and there is no need for a more detailed description here. These techniques are described in particular in "Journal of the Audio Enginnering Society", October 1979, volume 27, number 10, pages 793 to 802, and in "Theory and Application of Digital Signal Processing" by Lawrence R. Rabiner, published in 1975 by Prentice-Hall.

In the above description, the magnetic field control signal is constituted by combining two signals $I_1$ and $I_2$ each comprising alternating pulses and having respective periods $T_1$ and $T_2$. The signals are combined by causing groups of n periods of the signal $I_1$ of period $T_1$ to alternate with groups of m periods of the signal $I_2$ of period $T_2$.

Waveform diagrams 5(a), 5(b), and 5(c) show other possible combinations of the signals $I_1$ and $I_2$ of respective periods $T_1$ and $T_2$ and suitable for generating the magnetic field.

Waveforms 5(a) and 5(b) show two other control signal waveforms obtained by the same combination of signals having periods $T_1$ and $T_2$. In waveform 5(a) each period $T_1$ of the signal is constituted by a pulse of duration $T_1/2$ followed by a zero level for the same duration $T_1/2$. Each period $T_2$ of the signal is likewise constituted by a half-cycle pulse followed by a half-cycle zero level. In waveform 5(b) each cycle of either period includes both a positive-going pulse and a negativegoing pulse, but the pulses are separated from one another by short durations of zero level.

In waveform 5(c) the signal $I_1$ of period $T_1$ is a sinewave signal of constant amplitude, while the signal $I_2$ of period $T_2$ is an alternating pulse signal with each positive-going and negative-going pulse having a duration of $T_2/2$. In addition, $T_2$ is an integer multiple of $T_1$. These two signals are combined by being superposed in order to obtain the control signal. In this case it will be understood that the overall period T of the control signal is equal to the period $T_2$.

In all cases the signal of period $T_2$ includes a pulse of duration t', where t' is long enough to ensure that the voltage sensed at the end of the pulse is free from relaxation effects.

Figure 6:
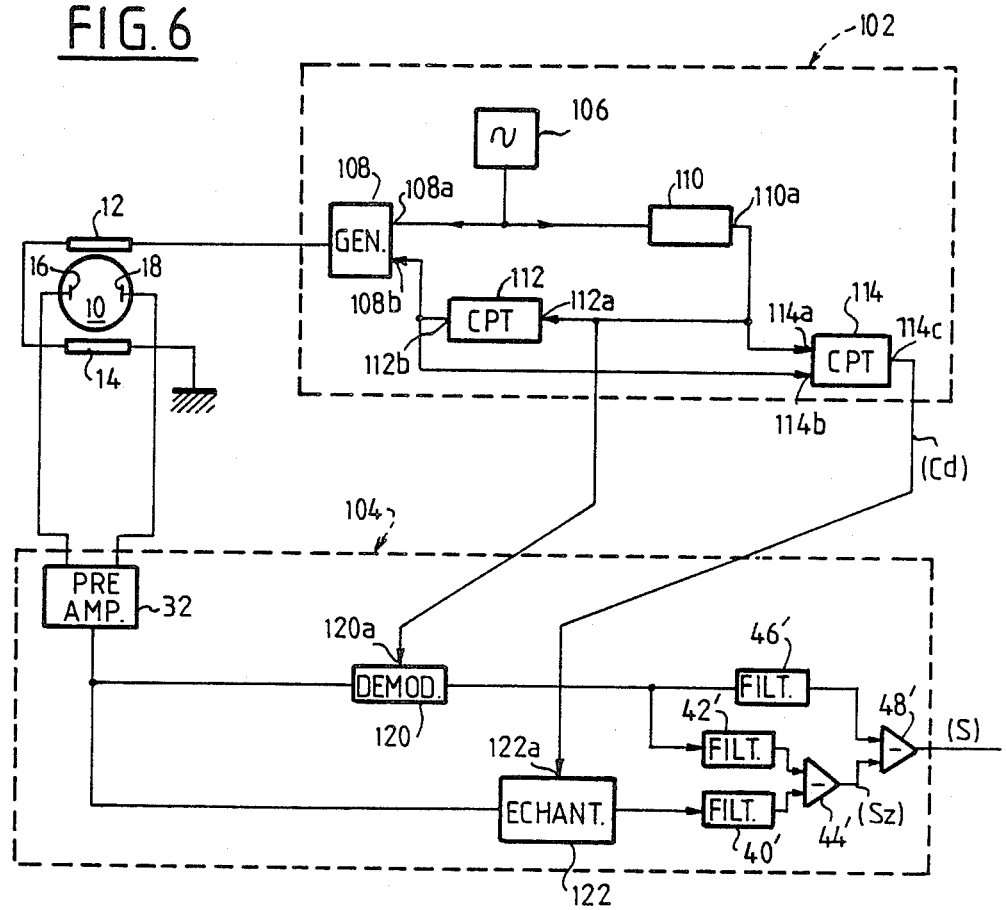
FIG. 6 is a block diagram of a second embodiment of a flow meter in accordance with the invention.

FIG. 6 shows a second embodiment of a flow meter in accordance with the invention and which makes use of a magnetic field generated by a control signal of the type shown in waveform 5(c). It comprises a measurement tube 10 having two induction windings 12 and 14 and two electrodes 16 and 18. The flow meter also includes a driver circuit 102 for generating the current which is applied to the induction windings 12 and 14 and a circuit 104 for processing the voltage signal which appears at the electrodes 16 and 18 of the flow meter.

Figure 6A:
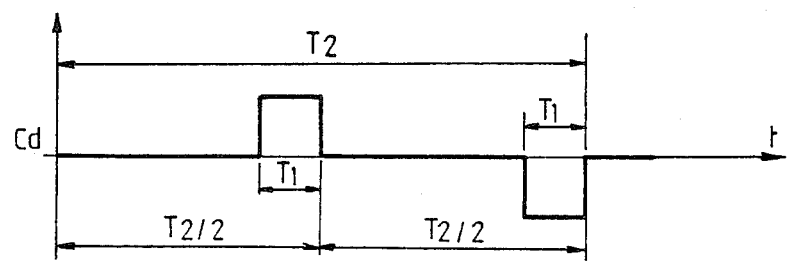
FIG. 6a is a waveform diagram of the control signals used in the FIG. 6 embodiment.

The current generator circuit 102 comprises an oscillator 106 which delivers a sinewave signal of period $T_1$. The output from the oscillator 106 is connected firstly to a first input 108a of a current generator 108, and secondly to the input of a shaper circuit 110. The output 110a from the shaper circuit 110 delivers a signal comprising alternating rectangular pulses having the same period $T_1$ as the sinewave signal delvere by the oscillator 106. The output 110a is connected firstly to the input 112a of a counter 112, and secondly to a first input 114a of a logic circuit 114. The output 112b from the counter 112 delivers a signal comprising alternating rectangular pulses of period $T_2$, where $T_2$ is a multiple of $T_1$. The output 112b is connected firstly to to a second input 108b of the current generator 108, and secondly to a second input 114b of the logic circuit 114. The current generator 108 responds to the signals applied to its first and second inputs 108a and 108b by delivering a current having waveform 5(c), and this current is applied to the induction windings 12 and 14. On its output 114c, the logic circuit 114 delivers a logic signal Cd having the waveform shown in Figure 6a, i.e. comprising a short positive-going pulse and a short negative-going pulse located at the ends of the positive-going and negative-going portions respectively of the signal of period $T_2$ delivered by the counter 112. Each of these "short" pulses lasts for a duration equal to two periods of the sinewave signal.

The processor circuit 104 comprises a preamplifier 116 which receives the voltage sensed by the electrodes 16 and 18 of the flow meter. The output from the preamplifier 116 is connected firstly to the input of a synchronous demodulator 120 and secondly to the input of a sampler and subtractor 122. The control input 120a of the demodulator 120 receives the signal delivered by the shaper 110 and the control input 122a of the sampler 122 receives the signal delivered by the logic circuit 114. Thus the output from the demodulator delivers a first intermediate measurement signal derived from the voltage sensed by the electrodes and corresponding to the sinewave signal of period $T_1$. The output from the circuit 122 delivers a second intermediate measurement signal which corresponds to the difference between a positive sample of the complete signal sensed during a complete period of the sinewave signal and a negative sample of the complete signal sensed during a complete period of the sinewave signal. Since both sampling instants are located at the ends of pulses in the signal of period $T_2$, the values of these samples are not degraded by the relaxation effect. The circuit 104 finally includes low pass filters 40', 42', and 46', analogous to the filters 40, 42, and 46 of FIG. 2, together with subtractors 44' and 48' identical to the circuits 44 and 48 of FIG. 2. The subtractor 48' thus delivers a flow rate measuring signal S at its output, which signal is unaffected by the phenomena of drift or noise.

This second embodiment has the advantage, for given periods $T_1$ and $T_2$, of reducing the value of the overall period T since in this case $T=T_2$ rather than $T=nT_1+mT_2$. However, the circuits are rather more complex since they must process both logical signals and sinewave signals.

In the above description, the numbers of periods m and n in the signals are integers, however there is no need for these numbers to be integers, so long as both m and n are not less than unity and n is greater than m.

Figure 5:
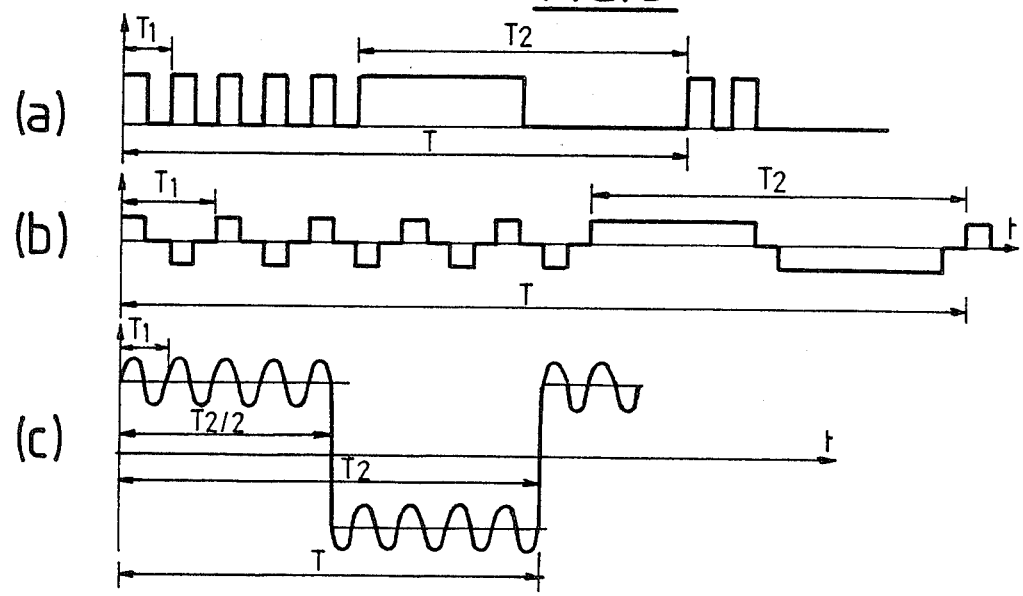
FIG. 5 shows other possible waveforms for the signal controlling the flow meter magnetic field.

Similarly, a good quality measurement signal (S) is obtained for a period $T_1$ lying in the range 100 milliseconds to 5 milliseconds, and for a period $T_2$ lying in the range 50 milliseconds and 1 second, with the 1 second value being acceptable in particular when using a current waveform of the type shown in FIG. 5(c).

It can thus be seen that in all embodiments of the invention, the measurement signal S is obtained by generating: two intermediate measurement signals $M_1$ and $M_2$ which correspond respectively to the periods $T_1$ and $T_2$ of the signal sensed by the electrodes; a correction signal based on the signals $M_1$ and $M_2$ and representative solely of the relaxation phenomenon; and finally a measurement signal S derived from the intermediate measurement signal $M_1$ and the correction signal.

We claim:

1. An electromagnetic flow meter comprising:
   a measuring tube for passing the liquid whose flow rate is to be measured;
   induction windings have an excitation current passing therethrough for setting up a magnetic field perpendicular to the direction of liquid flow;
   diametrically-opposed electrodes for sensing the voltage signal which results from the flow of liquid through the magnetic field;
   a circuit for feeding current to said induction windings and comprising means for generating a periodic excitation current of period T, each period T being the result of a combination in time of n periods of a first excitation current ($I_1$) of period $T_1$ and m period of a second excitation current ($I_2$) of period $T_2$, where $T_2>T_1$, with the period $T_2$ being long enough to ensure that portion of the corresponding sensed voltage signal is free from the relaxation phenomenon; and
   a processor circuit comprising means for generating a first intermediate measurement signal ($M_1$) of period $T_1$ and having a short response time, a second intermediate measurement signal ($M_2$) corresponding to the voltage signal of period $T_2$ and being free from measurement drift, and for combining and filtering said first and second intermediate measurement signals in order to generate a measurement signal S being both short in response time and free from drift.

2. A flow meter according to claim 1, wherein the first and second excitation currents are currents in which the periods are constituted by alternating positive-going and negative-going pulses, each of duration $T_1/2$ or $T_2/2$ as the case maybe, and wherein said combination consists in alternating n periods of the first current with m periods of the second current so as to obtain the relationship:

$$T=nT_1+mT_2$$

3. A flow meter according to claim 2, wherein m is equal to 1, the period $T_1$ lies in the range 100 milliseconds to 5 milliseconds, and the period $T_2$ lies in the range 50 milliseconds to 1 second.

4. A flow meter according to claim 1, wherein the first excitation current is a sinewave current and wherein each period of said second excitation current consists in a positive-going half cycle and a negative-going half cycle of duration $t'=T_2/2$, said combination consisting of superposing said first and second currents to obtain the relationship:

$$T=nT_2$$

5. A flow meter according to claim 4, wherein the period $T_2$ lies in the range 50 milliseconds to 1 second, and wherein the period $T_1$ lies in the range 100 milliseconds and 5 milliseconds.

6. A flow meter according to claim 1, wherein said processor circuit comprises means for generating a correction signal based on said intermediate measurement signals $M_1$ and $M_2$, said correction signal being substantially free from noise, together with means for generating said measurement signal s from said first intermediate measurement signal $M_1$ and said correction signal, said measurement signal being substantially free from drift.

7. A flow meter according to claim 6, wherein said correction signal which is substantially free from noise is representative of the relaxation error measured at predetermined instants relative to the voltage signal of period $T_1$, and said first intermediate measurement signal $M_1$ is representative of said voltage signal of period $T_1$ at said predetermined instants.

8. A flow meter according to claim 1, wherein said processor circuit comprises means for filtering the first intermediate measurement signal $M_1$ with a response time $t_1$, means for generating a correction signal equal to the difference between the first and second intermediate measurement signals $M_1$ and $M_2$, means for filtering said difference signal with a response time of $t_2$, where $t_2$ is long enough to ensure that the filtered correction signal is substantially free from noise, and means for subtracting said filtered difference from the filtered first intermediate signal, thereby obtaining the measurement signal (S) having a response time $t_1$ and being substantially free from drift.

9. A flow meter according to claim 1, wherein said processor circuit comprises means for filtering both intermediate measurement signals $M_1$ and $M_2$ with a response time $t_2$, and for generating a correction signal equal to the difference between said filtered signals, where $t_2$ is sufficiently long to ensure that said filtered signals are substantially free from noise, means for filtering the first intermediate measurement signal $M_1$ with a response time $t_1$, means for generating the difference between the correction signal and said first intermediate measurement signal $M_1$ as filtered with a response time of $t_1$, thereby ensuring that the measurement signal S has a response time of $t_1$ and is substantially free from drift.

* * * * *